(12) United States Patent
Narisawa et al.

(10) Patent No.: US 9,610,906 B2
(45) Date of Patent: Apr. 4, 2017

(54) VEHICLE CONTROL DEVICE

(71) Applicant: Hitachi Automotive Systems, Ltd., Hitachinaka-shi, Ibaraki (JP)

(72) Inventors: Fumio Narisawa, Tokyo (JP); Tsunamichi Tsukidate, Tokyo (JP)

(73) Assignee: Hitachi Automotive Systems, Ltd., Hitanchinaka-shi (JP)

( * ) Notice: Subject to any disclaimer, the term of this patent is extended or adjusted under 35 U.S.C. 154(b) by 0 days.

(21) Appl. No.: 14/913,631

(22) PCT Filed: Jun. 16, 2014

(86) PCT No.: PCT/JP2014/065836
§ 371 (c)(1),
(2) Date: Jun. 2, 2016

(87) PCT Pub. No.: WO2015/025597
PCT Pub. Date: Feb. 26, 2015

(65) Prior Publication Data
US 2016/0304040 A1 Oct. 20, 2016

(30) Foreign Application Priority Data

Aug. 22, 2013 (JP) .................................. 2013-172567

(51) Int. Cl.
*G06F 7/00* (2006.01)
*B60R 16/023* (2006.01)
(Continued)

(52) U.S. Cl.
CPC .......... *B60R 16/0231* (2013.01); *G05B 15/02* (2013.01); *G06F 9/4831* (2013.01); *G06F 9/4881* (2013.01)

(58) Field of Classification Search
CPC ..... G06F 9/4881; G06F 9/4831; G05B 15/02; B60R 16/0231
(Continued)

(56) References Cited

U.S. PATENT DOCUMENTS 4,794,526 A * 12/1988 May ........................ G06F 9/54
718/103
5,193,189 A * 3/1993 Flood ................... G05B 19/052
700/11
(Continued)

FOREIGN PATENT DOCUMENTS

JP 2012-247978 A 12/2012
JP 2013-161299 A 8/2013

OTHER PUBLICATIONS

PCT International Search Report issued in application PCT/JP2014/065836 mailed Aug. 12, 2014.

*Primary Examiner* — Gertrude Arthur Jeanglaud
(74) *Attorney, Agent, or Firm* — Foley & Lardner LLP (57) ABSTRACT

Executing control software with an appropriate execution priority in accordance with a safety standard in a vehicle control device that executes a plurality of control software having different safety standards suppresses priority degree reversal. A vehicle control device is provided with an execution waiting job list retaining a list of jobs waiting for execution by a processor. A request for calling higher safety software from lower safety software is inserted at a position in the execution waiting job list in accordance with the execution priority of the lower safety software.

6 Claims, 5 Drawing Sheets

(51) Int. Cl.
   *G06F 9/48*   (2006.01)
   *G05B 15/02*  (2006.01)
(58) Field of Classification Search
   USPC .................................. 701/36; 718/103, 107
   See application file for complete search history.

(56) References Cited

U.S. PATENT DOCUMENTS

2012/0029659 A1    2/2012  Taira et al.
2015/0248742 A1*   9/2015  Yamamoto ............... G09G 5/39
                                                  345/522

* cited by examiner

FIG. 3

```
CallSafetyFunction      /* standard API */         300
(
    safefunc1,          /* process ID */          301
    0x3f8e9a02,         /* authentication code */ 302
    0x0d,               /* execution priority */  303
    args                /* argument */            304
)
```

VEHICLE CONTROL DEVICE

TECHNICAL FIELD

The present invention relates to vehicle control devices.

BACKGROUND ART

As vehicle control devices controlling such as engines of cars, ECUs (Electronic Control Units) equipping microcontrollers are used. Software equipped in a microcontroller is generally configured by such as an application program that describes control processes, as device driver that describes input/output processes, and an operating system (OS).

It is required for vehicle control devices to implement high safety because vehicle control devices perform control processes that are directly concerned with safety of the car occupant. As the control process becomes sophisticated and the size of the control process is increased, it has become a technical problem that huge amount of worker-hour is required to implement vehicle control devices with high safety. Instead of developing all components of the vehicle control device under a development process corresponding to high safety level, it is conceivable to develop portions of the software that require high safety under a development process corresponding to high safety level, and to develop other portions of the software under a normal development process. This achieves both high safety and suppressing worker-hour for development. Such a method is referred to as Decomposition of safety (Non Patent Literature 1).

In addition to the decomposition of safety in the development process, the implement cost of ECU may be optimized while keeping high safety level, if it is possible to implement multiple pieces of software with different safety levels on a same microcontroller so that the multiple pieces of software do not interfere with each other. Specifically, a technique that prevents memory areas accessed by each of software from interfering with each other is referred to as memory protection.

A memory protection is usually achieved by dedicated hardware referred to as MPU (Memory Protection Unit) that monitors an address bus for accessing memory areas in the microcontroller. A microcontroller that performs memory protection using MPU includes different operational modes. Each of the operational modes corresponds to each of the safety levels. Typically, a microcontroller that protects the memory using MPU includes a user mode and a privilege mode. The user mode corresponds to low safety software (the required safety level is low). The privilege mode corresponds to high safety software (the required safety level is high).

When switching the operational mode, an authority configuration register that stores the current operational mode is rewritten. When switching from the user mode into the privilege mode, the low safety software operating in the user mode is typically prohibited to rewrite the authority configuration register. This configuration is intended so that unexpected operations do not propagate into high safety software due to malfunctions of low safety software operating in the user mode. Therefore, when switching from the user mode into the privilege mode, a predetermined interruption process is generated through an interruption controller, thereby switching into the privilege mode.

Patent Literature 1 listed below describes a configuration example where a safety-related application and a safety-nonrelated application are implemented on a same hardware and where each of the applications is executed while switching the user mode and the privilege mode.

CITATION LIST

Patent Literature

Patent Literature 1: JP Patent Publication (Kokai) 2012-247978 A

Non Patent Literature

Non Patent Literature 1: ISO 26262 Functional Safety: Automotive Road Vehicle

SUMMARY OF INVENTION

Technical Problem

It is necessary to execute the control process of car at the optimum timing according to the car behavior. There exists execution intervals that are suitable for calculating each of control parameters. In general, the execution priority is set at a higher level for jobs with shorter execution intervals, and is set at a lower level for jobs with longer execution intervals. On the other hand, the interruption control mentioned above is managed by an interruption controller equipped in the microcontroller. The interruption controller activates an interruption process corresponding to the reason of interruption. The interruption process is activated separately from the processes with the execution intervals above. Thus it is necessary to configure the priority of the interruption process so that the interruption process will not delay the processes of each execution intervals.

When the operational mode of the microcontroller switches between the user mode and the privilege mode, the interruption process is generated as mentioned above. A same priority level is always assigned to the interruption process separately from the safety levels of software requesting the interruption process. Therefore, each of the interruption processes is executed in the generated order.

However, there exists various values of the actual safety level of software requesting the interruption process. For example, an interruption process in which the low safety software calls the functionality of the high safety software may have the same priority level as that of the low safety software. If the interruption process is executed before other processes, the subsequent processes with higher priority levels may be forced to wait until the interruption process is finished. This phenomenon is referred to as priority reversal, which may cause the subsequent processes not to be finished within the predetermined execution intervals.

The present invention is made to solve the above-described technical problems. It is an objective of the present invention to suppress, in a vehicle control device that executes a plurality of control software with different safety levels, priority reversal by executing control software with appropriate execution priority levels in accordance with safety level.

Solution to Problem

A vehicle control device according to the present invention comprises an execution waiting job list that holds a job list waiting for being executed by a processor. A request from low safety software to call high safety software is inserted into a position of the execution waiting job list corresponding to an execution priority level of the low safety software.

Advantageous Effects of Invention

With the vehicle control device according to the present invention it is possible to suppress priority reversal due to an interruption request by storing the request from the low safety software to call the high safety software into the execution waiting job list.

DESCRIPTION OF EMBODIMENTS

Embodiment 1

Figure 1:
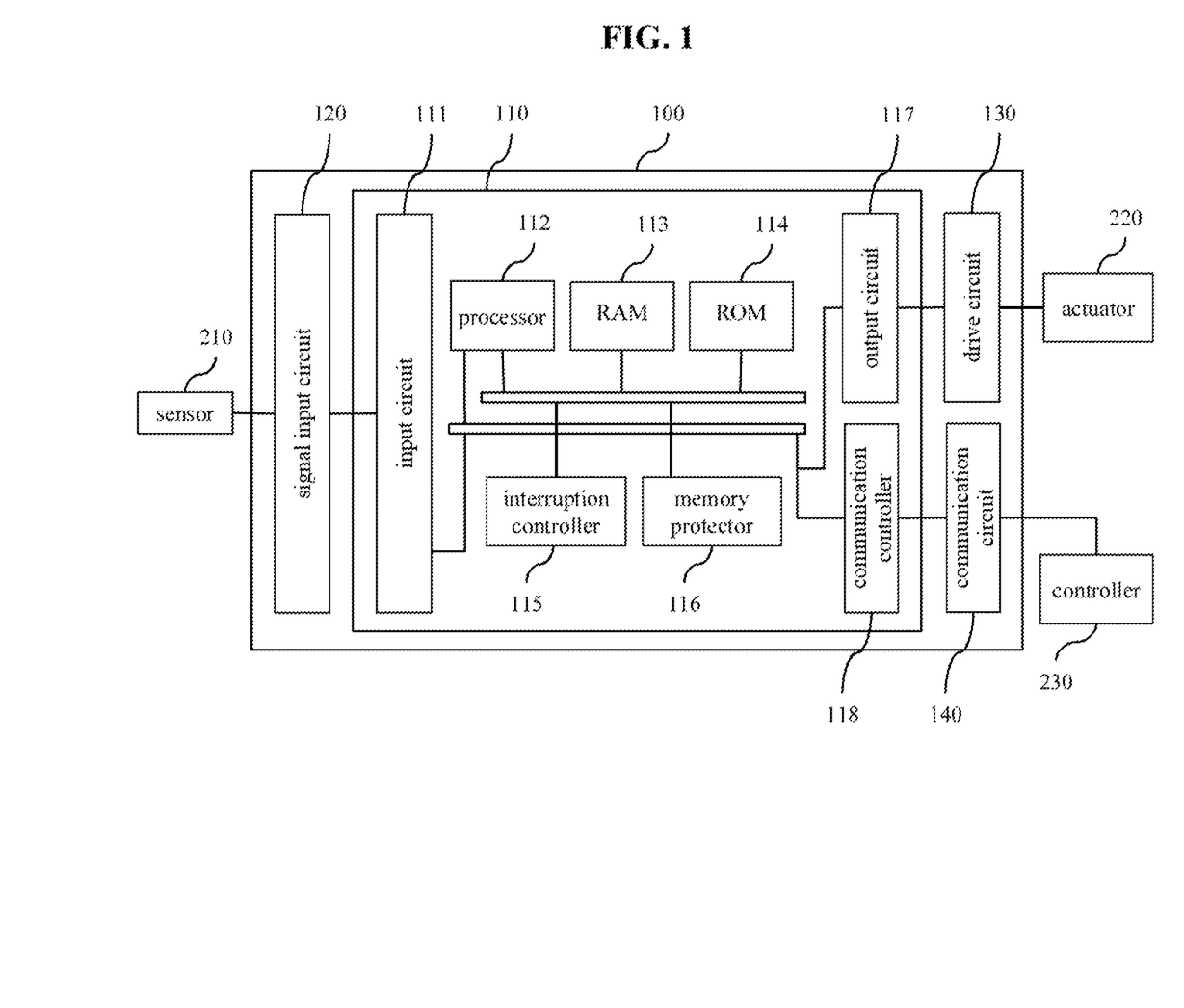
FIG. 1 is a functional block diagram of a vehicle control device 100 according to an embodiment 1.

FIG. 1 is a functional block diagram of a vehicle control device 100 according to an embodiment 1 of the present invention. The vehicle control device 100 includes a microcontroller 110, a signal input circuit 120, a drive circuit 130, and a communication circuit 140. The signal input circuit 120 receives a measured result from a sensor 210, and outputs the measured result to the microcontroller 110. The microcontroller 110 performs control calculations using the received measured result, and drives an actuator 220 through the drive circuit 130 according to the calculated result. The microcontroller 110 may also perform the control calculations according to signals received from a controller 230 through the communication circuit 140.

The microcontroller 110 includes an input circuit 111, a processor 112, a RAM (Random Access Memory) 113, a ROM (Read Only Memory) 114, an interruption controller 115, a memory protector 116, an output circuit 117, and a communication controller 118. The processor 112 executes control calculations defined by control programs. The RAM 113 stores data such as those temporally used by the processor 112. The ROM 114 stores control programs described in FIG. 2 later. The interruption controller 115 will be described later. The memory protector 116 is a MPU that protects memory areas.

Figure 2:
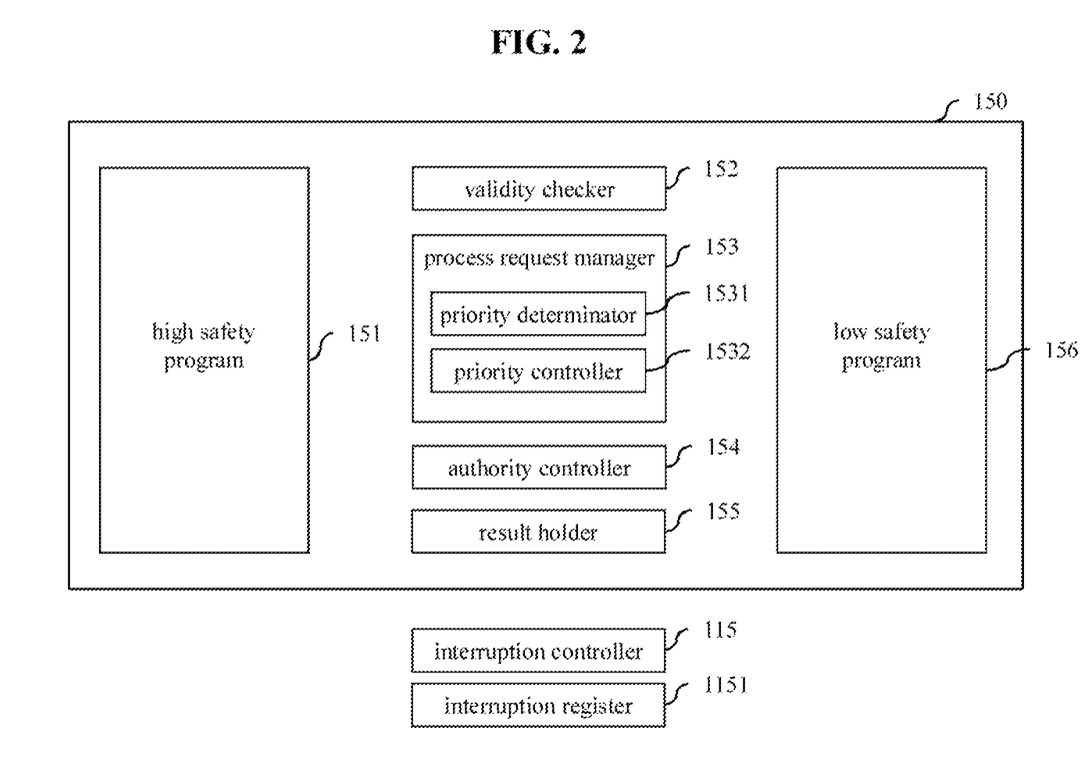
FIG. 2 is a configuration diagram of control software 150 executed by a processor 112.

FIG. 2 is a configuration diagram of control software 150 executed by the processor 112. The control software 150 is stored in the ROM 114. The control software 150 is read into the RAM 113 when necessary. The control software 150 includes a high safety program 151, a validity checker 152, a process request manager 153, an authority controller 154, a result holder 155, and a low safety program 156. The process request manager 153 further includes a priority determinator 1531, and a priority controller 1532.

The high safety program 151 is a program that is required to implement high safety level. A type of programs corresponds to the high safety program 151, such as those that monitor whether the car is in a normal state and that move the car behavior into a safe state when the car deviates from the normal state. The microcontroller 110 moves to a privilege mode when executing the high safety program 151. The low safety program 156 is a program that is required to implement safety level lower than that of the high safety program 151. For example, a type of programs that perform the control calculation itself corresponds to the low safety program 156. The low safety program 156 can call functionalities included in the high safety program 151. However, the call procedure must be performed through the process request manager 153. Details will be described later.

The validity checker 152 checks whether a request from the low safety program 156 to call the high safety program is valid. The process request manager 153 is an interface that receives the request from the low safety program to call the high safety program 151. The priority determinator 1531 and the priority controller 1532 will be described later. The authority controller 154 requests the interruption controller 115 to perform an interruption process in which the low safety program 156 calls the high safety program 151. The result holder 155 holds results of the executed interruption process.

The control software 150 may be implemented as a single program, or may be implemented with each of the units in FIG. 2 as individual programs. For the sake of convenience of description, there are a single one of the high safety program 151 and a single one of the low safety program 156 in FIG. 2. However, there may be any number of those programs.

The interruption controller 115 generates an interruption process that executes a job corresponding to a process ID stored in the interruption register 1151. The processor 112 executes the job by interruption according to the interruption process.

Hereinafter, for the sake of convenience of description, each of units in the control software 150 may be described as an actor. However, it is noted that the processor 112 actually executes the units in the control software 150.

Figure 3:
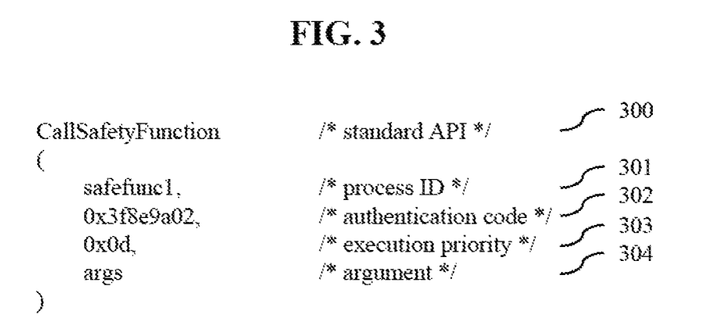
FIG. 3 is a diagram exemplifying an API function 300 performed by a low safety program 156 when calling a high safety program 151.

FIG. 3 is a diagram exemplifying an API function 300 performed by the low safety program 156 when calling the high safety program 151. The process request manager 153 provides the API function 300 such as shown in FIG. 3. The low safety program 156 issues, to the process request manager 153, a request for calling the high safety program 151 using the API function 300. It is necessary for the microcontroller 110 to move to the privilege mode in order to call the high safety program 151 form the low safety program 156. Thus an interruption process will be generated for moving the mode.

The process ID 301 is an identifier of the function in the high safety program 151 that is to be called. The authentication code 302 is authentication information for indicating that the request is valid. Details will be described later. The execution priority 303 is a value that designates a priority level when executing the function in the high safety program 151 to be called. The argument 304 is an argument that is assigned to the function in the high safety program 151 to be called.

The validity checker 152 previously holds an authentication code table describing a relationship between the process ID 301 and the authentication code 302. The validity checker 152 can authenticate whether the request is valid according to whether the process ID 301 and the authentication code 302 designated by the API function 300 match with the description of the authentication code table.

A value corresponding to the execution priority of the low safety program 156 will be set as the execution priority 303. However, if the priority of the interruption process for moving the mode is higher than the execution priority 303, the priority reversal mentioned above will occur because the interruption process is more prioritized. Thus in the present invention, the process request manager 153 controls the execution priority of the interruption process, thereby suppressing the priority reversal. Details will be described later using FIG. 4 and subsequent figures.

Figure 4:
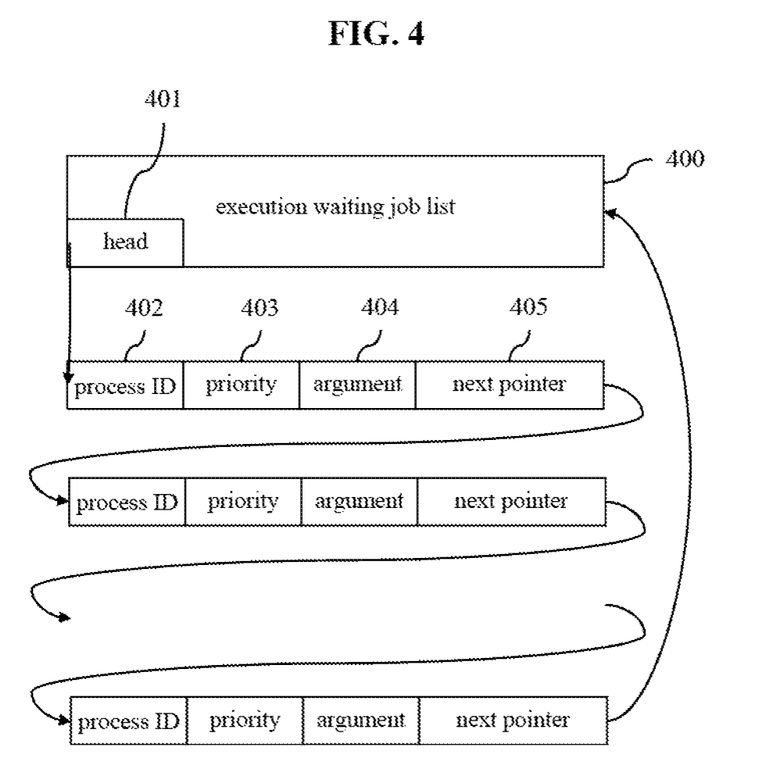
FIG. 4 is a configuration diagram of an execution waiting job list 400 managed by a priority controller 1532.

FIG. 4 is a configuration diagram of an execution waiting job list 400 managed by the priority controller 1532. The execution waiting job list 400 is used by the priority controller 1532 to control execution priorities of jobs. The execution waiting job list 400 holds a list of jobs that are waiting for being executed by the processor 112. The job mentioned here is a process in which the processor 112 executes the function in the high safety program 151 called by the low safety program 156. The execution waiting job list 400 is sorted in descending order of the priority 403.

The head pointer 401 is a pointer pointing a job to be executed first in the job list stored in the execution waiting job list 400. The process ID 402 is an identifier of the job to be executed. The process ID 402 corresponds to the process ID 301 when the low safety program 156 calls functions in the high safety program 151. The priority 403 is a priority level when executing the relevant job. The priority 403 corresponds to the execution priority 303 when the low safety program 156 calls functions in the high safety program 151. The argument 404 is an argument assigned to the relevant job. The argument 404 corresponds to the argument 304 when the low safety program 156 calls functions in the high safety program 151. The next pointer is a pointer pointing the next element in the execution waiting job list 400.

When storing a new job into the execution waiting job list 400, the priority controller 1532 stores the new job at a position so that the job list is sorted in descending order of the priority 403. The priority controller 1532 picks up the jobs in the execution waiting job list 400 from the head position, and passes it to the authority controller 154. The authority controller 154 stores the received job into the interruption register 1151. In this way, the jobs in the execution waiting job list 400 are executed by interruption in descending order of the priority 403. Thus even if the interruption process is executed at a high priority level, it is possible to suppress priority reversal.

Figure 5:
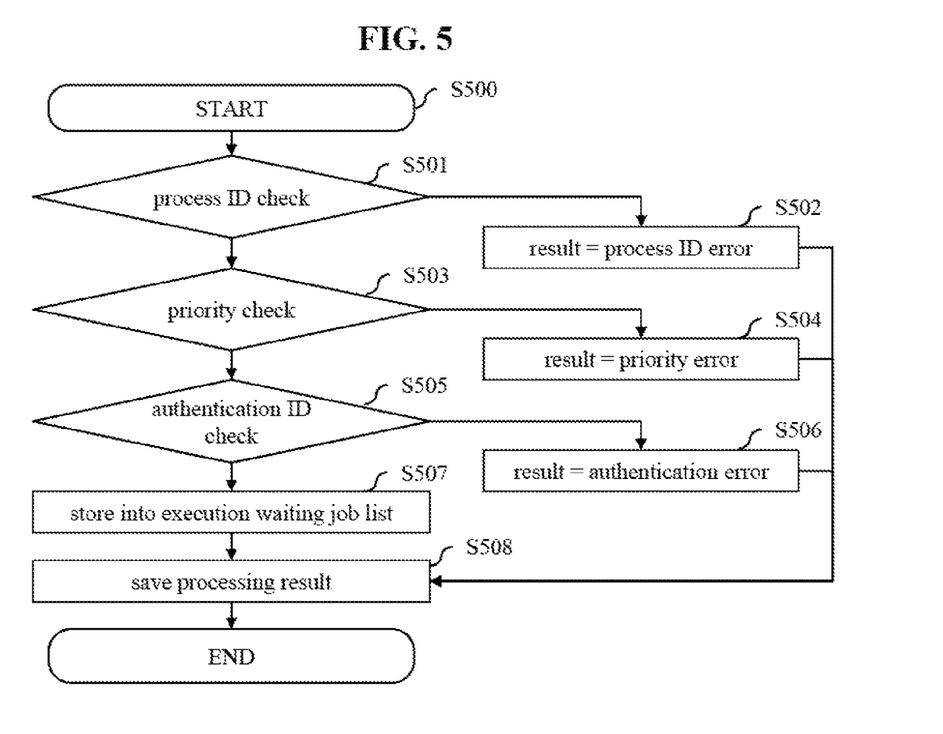
FIG. 5 is a flowchart showing an operation when the low safety program 156 issues a request to call a function in the high safety program 151.

FIG. 5 is a flowchart showing an operation when the low safety program 156 issues a request to call a function in the high safety program 151. Hereinafter, each step in FIG. 5 will be described.

(FIG. 5: Step S500)

The low safety program 156 issues, to the process request manager 153, a request to call a function in the high safety program 151 using the API function 300 described in FIG. 3. When the process request manager 153 receives the request, this flowchart starts.

(FIG. 5: Step S501)

The validity checker 152 checks whether the process ID 301 received by the process request manager 153 in step S500 is within a predetermined upper and lower limits. If the process ID 301 is within the limits, the process proceeds to step S503. If not, the process proceeds to step S502.

(FIG. 5: Step S502)

The validity checker 152 sets an error as a processing result for the request issued by the low safety program 156 indicating that the range of the process ID 301 was invalid. After this step, the process skips to step S508.

(FIG. 5: Step S503)

The validity checker 152 checks whether the execution priority 303 received by the process request manager 153 in step S500 is within a predetermined upper and lower limits. If the execution priority 303 is within the limits, the process proceeds to step S505. If not, the process proceeds to step S504.

(FIG. 5: Step S504)

The validity checker 152 sets an error as a processing result for the request issued by the low safety program 156 indicating that the range of the execution priority 303 was invalid. After this step, the process skips to step S508.

(FIG. 5: Step S505)

The validity checker 152 checks whether the request is valid by comparing the pair of the process ID 301/the authentication code 302 received by the process request manager 153 in step S500 with the description in the authentication code table. If the authentication succeeds, the process proceeds to step S507. If not, the process proceeds to step S506.

(FIG. 5: Step S506)

The validity checker 152 sets an error as a processing result for the request issued by the low safety program 156 indicating that the authentication code 302 was invalid. After this step, the process skips to step S508.

(FIG. 5: Step S507)

The priority determinator 1531 determines a position into which the request is to be inserted in the execution waiting job list 400 according to the execution priority 303. The priority controller 1532 inserts the request into the determined position. The priority controller 1532 sets a processing result for the request issued by the low safety program 156 indicating that the request was properly processed.

(FIG. 5: Step S508)

The result holder 155 saves the processing result for the request issued by the low safety program 156. The result holder 155 may also save information indicating the time sequence such as a timestamp of the processing result for the sake of performing error analysis later, for example.

Figure 6:
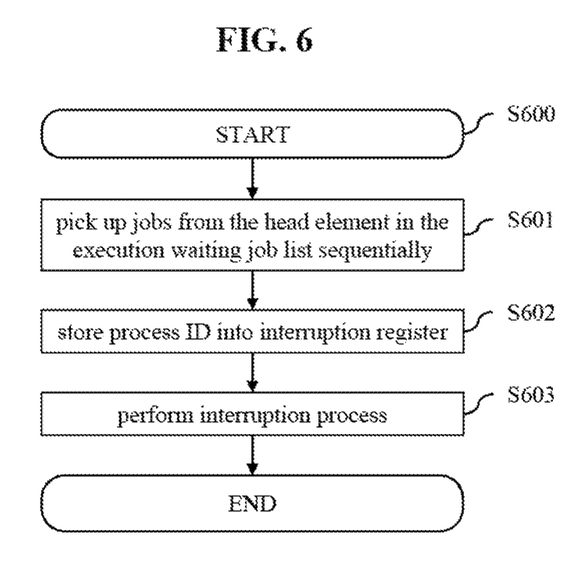
FIG. 6 is a flowchart showing a process for performing an interruption process.

FIG. 6 is a flowchart showing a process for performing an interruption process. Hereinafter, each step in FIG. 6 will be described.

(FIG. 6: Step S600)

The priority controller 1532 performs this flowchart at a sufficiently short interval, for example. Alternatively, the priority controller 1532 may start this flowchart again immediately after step S603 is finished.

(FIG. 6: Steps S601-S602)

The priority controller 1532 picks up as job from the head element in the execution waiting job list 400 sequentially (S601). The priority controller 1532 stores the process ID 402 of the job picked up in step S601 into the interruption register 1151 (S602).

(FIG. 6: Step S603)

The authority controller 154 passes the process ID 402 stored in the interruption register 1151 to the interruption controller 115. The interruption controller 115 instructs the processor 112 to execute a job corresponding to the process ID 402 by interruption. The processor 112 executes the job by interruption.

(FIG. 6: Step S603: Additional Note No. 1)

If the execution waiting job list 400 stores a job in which the low safety program 156 calls a function in the high safety program 151, the job will be executed by interruption in this step. Since the execution waiting job list 400 is sorted in the order of the priority 403, it is possible to execute the job at a priority level corresponding to the execution priority 303 designated by the low safety program 156 even if the priority of the interruption process itself is high. Therefore, it is possible to suppress priority reversal.

(FIG. 6: Step S603: Additional Note No. 2)

If a function in the high safety program 151 is directly called by the low safety program 156 without passing through the process request manager 153 because of malfunction of the low safety program 156, for example, the memory protector 116 detects it and saves the contents of the request. The developer analyzes the cause of the malfunction by analyzing the saved contents of the request, for example.

Embodiment 1

Summary

As discussed thus far, when the low safety program 156 issues a request to call the high safety program 151, the vehicle control device 100 according to the embodiment 1 stores the job at a position corresponding to the execution priority 303 in the execution waiting job list 400. The interruption controller 115 causes the processor 112 to execute each of the jobs by interruption in the order by which the jobs is stored in the execution waiting job list 400. Accordingly, even if the priority of the interruption process generated by the interruption controller 115 is high, it is possible to move the microcontroller 110 into the privilege mode at the priority level corresponding to the execution priority 303 designated by the low safety program 156 and to call the high safety program 151. Therefore, it is possible to suppress priority reversal.

When the low safety program 156 issues a request to call the high safety program 151, the vehicle control device 100 according to the embodiment 1 checks whether the request is valid according to the authentication code 302. Accordingly, it is possible to discard the request if the request is an invalid request caused by malfunction.

Embodiment 2

In the embodiment 1, the job identifier executed by interruption is stored in the interruption register 1151, and the interruption controller 115 causes the job corresponding to the identifier to be executed by interruption. However, some types of the microcontroller 110 do not include a function to launch jobs corresponding to arbitrary process IDs using the interruption register 1151. In such cases, the process ID to be executed by interruption may be hard-coded in the program instead of storing the process ID into the interruption register 1151.

Specifically, a list of identifiers of functions in the high safety program 151 that are to be executed by interruption may be hard-coded in the process request manager 153. When the low safety program 156 issues a request to call any one of those functions, the process ID corresponding to the identifier of the function is passed to the interruption controller 115 directly. In this way, even if the microcontroller 110 does not include a function to utilize interruption register, it is possible to implement the same functionality as in the embodiment 1.

In the embodiment 2, it is necessary to previously identify the functions in the high safety program 151 that will be called by the low safety program 156, and to hard-code the identified functions. Thus the versatility in the embodiment 2 may be lower than that of the embodiment 1.

The present invention is not limited to the described embodiments, and various modifications are also included within the scope of the present invention. The embodiments above are intended to facilitate understanding of the present invention. It is not intended to limit the scope of the present invention to the configuration where all of the described components are included.

REFERENCE SIGNS LIST

100: vehicle control device
110: microcontroller
111: input circuit
112: processor
113: RAM
114: ROM
115: interruption controller
116: memory protector
117: output circuit
118: communication controller
120: signal input circuit
130: drive circuit
140: communication circuit
150: control software
151: high safety program
152: validity checker
153: process request manager
154: authority controller
155: result holder
156: low safety program
400: execution waiting job list

The invention claimed is:

1. A vehicle control device comprising:
a storage unit that stores a first program describing an operation for controlling a vehicle, and that stores a second program describing an operation for controlling the vehicle with a safety level lower than that of the operation described in the first program;
a processor that executes the first program and the second program;
a priority controller that controls a priority when the processor executes the first program and a priority when the processor executes the second program; and
an execution waiting job list that describes a list of jobs waiting for being executed by the processor,
wherein the processor is configured to perform, when executing a process described in the first program, an interruption process that moves into an operational mode with a priority higher than that of when executing a process described in the second program,
wherein the execution waiting job list describes the list of jobs in descending order of priority at which the processor executes the job,
wherein the priority controller receives, from the second program, a request to call the first program,
wherein the priority controller inserts a job to call the first program at a position in the execution waiting job list corresponding to a priority designated by the second program when the second program calls the first program,
and wherein the processor executes a job included in the list of jobs in order of the priority described in the execution waiting job list.

2. The vehicle control device according to claim 1,
wherein the vehicle control device further comprises:
a validity checker that checks whether a request from the second program to call the first program is valid; and
an authentication code table that holds an authentication code that is to be designated when the second program calls the first program,
wherein the second program is configured to designate the authentication code when calling the first program,
wherein the validity checker checks whether a request from the second program to call the first program is valid by comparing an authentication code designated by the second program when calling the first program with an authentication code stored in the authentication code table,
and wherein the validity checker allows the call if the request is valid and denies the call if the request is not valid.

3. The vehicle control device according to claim 2,
wherein the vehicle control device further comprises:
an interruption controller that performs an interruption control for jobs executed by the processor; and
an interruption register that stores an identifier of a job that is to be executed by the processor by interruption according to an instruction from the interruption controller,
wherein the priority controller stores an identifier of a job included in the list of jobs into the interruption register according to order of the priority described in the execution waiting job list,
wherein if the job stored in the interruption register is a job to execute the first program, the interruption controller outputs an interruption instruction to the processor to execute a job corresponding to the identifier of a job,
and wherein the processor executes a job according to the interruption instruction outputted by the interruption controller, thereby executing a job included in the list of jobs according to order of the priority described in the execution waiting job list.

4. The vehicle control device according to claim 2,
wherein the vehicle control device further comprises an interruption controller that performs an interruption control for jobs executed by the processor,
wherein if a job described in the execution waiting job list is a job to execute the first program, the priority controller requests the interruption controller to launch a job included in the list of jobs by interruption according to order of the priority described in the execution waiting job list,
wherein the interruption controller outputs an interruption instruction to the processor to execute a job corresponding to the identifier of a job designated by the priority controller,
and wherein the processor executes a job according to the interruption instruction outputted by the interruption controller, thereby executing a job included in the list of jobs according to order of the priority described in the execution waiting job list.

5. The vehicle control device according to claim 2,
wherein the vehicle control device further comprises a result holder that holds a check result by the validity checker,
and wherein the result holder holds, along with the check result, information indicating a time sequence of the check result.

6. The vehicle control device according to claim 1,
wherein the vehicle control device further comprises a memory protector that detects a situation where the second program calls the first program without passing through the priority controller, and that saves a log describing a content of the request.

* * * * *